C. R. WEST.
EXCAVATING APPARATUS.
APPLICATION FILED DEC. 2, 1914.

1,154,357.                              Patented Sept. 21, 1915.

Witnesses
E. H. Wagner.
D. R. Partello.

Inventor
Cyrus R. West
By Robb & Robb
Attorneys

UNITED STATES PATENT OFFICE.

CYRUS R. WEST, OF DAWSON, YUKON TERRITORY, CANADA.

EXCAVATING APPARATUS.

1,154,357.  Specification of Letters Patent.  Patented Sept. 21, 1915.

Application filed December 2, 1914. Serial No. 875,154.

*To all whom it may concern:*

Be it known that I, CYRUS R. WEST, a citizen of the United States, residing at Dawson, Yukon Territory, Canada, have invented certain new and useful Improvements in Excavating Apparatus, of which the following is a specification.

The present invention relates to improvements in excavating apparatus and in particular to that type of devices known as drag scrapers, the object in view being to provide a scoop with a movable scraper or shovel so arranged as to perform a scraping function for loading the scoop under actuation of the forward draft means and shiftable to move out of the path of the discharging load in the tilting of the device by rear draft means.

More specifically speaking my invention consists of a receptacle to which a shovel is pivotally secured and adapted to be actuated through draw bars connected to a head line whereby the shovel is pulled into excavating position, a tail line being operatively connected to the shovel in such a manner as to cause the same to be lifted upon initial application of stress to the tail line and tilting of the receptacle upon further continuous draft.

A further object in mind is the arrangement of the shovel hereinbefore mentioned with respect to the scoop so that when the same is drawn into excavating position it coöperates with the scoop to hold the excavated material therein and in the action of removal of the shovel from excavating position the contents of the receptacle are forcibly ejected by coöperation of said receptacle with the shovel.

These and such other objects as may hereinafter appear are attained by the novel construction, combination and arrangement of parts to be hereinafter specifically described and claimed.

Reference will now be had to the accompanying drawings forming a part of this specification, wherein:—

Figure 1:
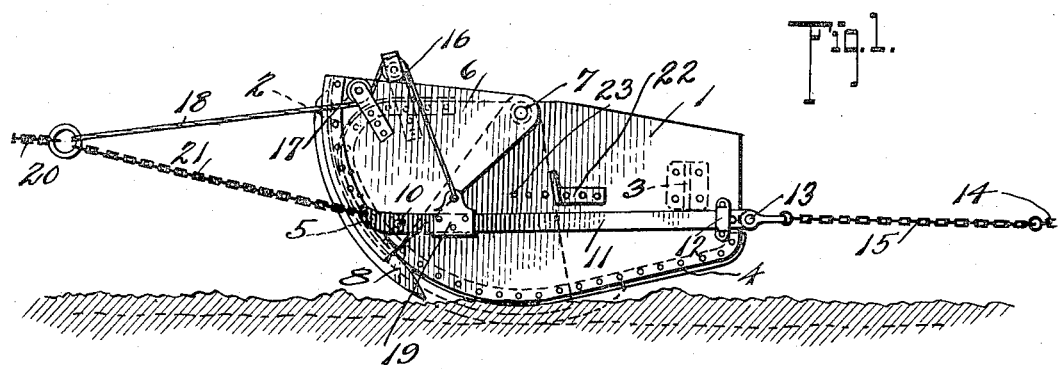
Figure 2:
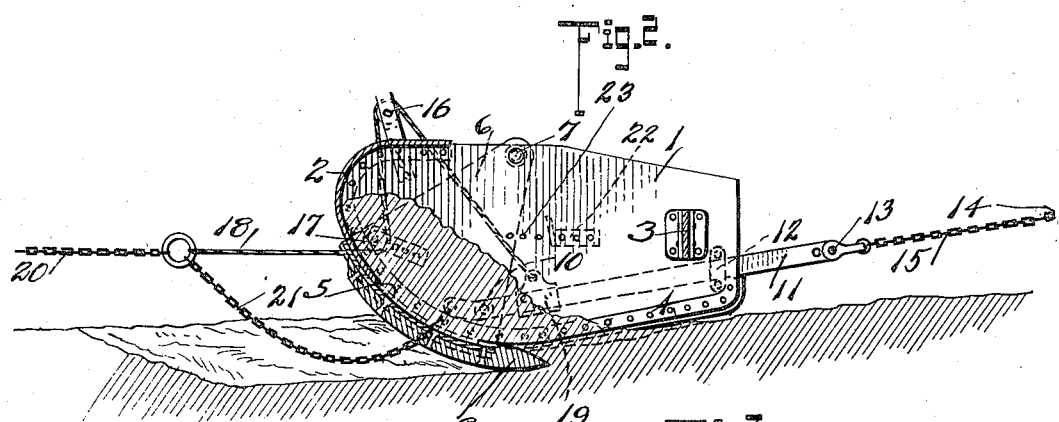
Figure 3:
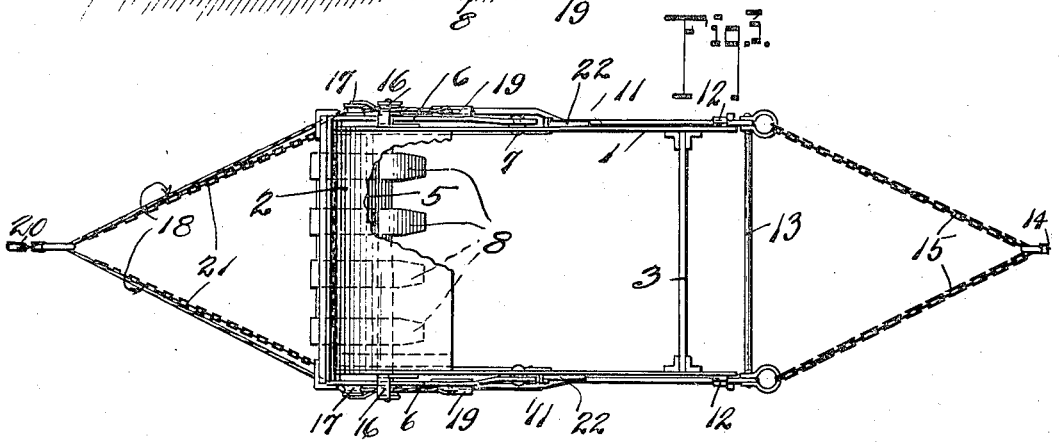
Figure 4:
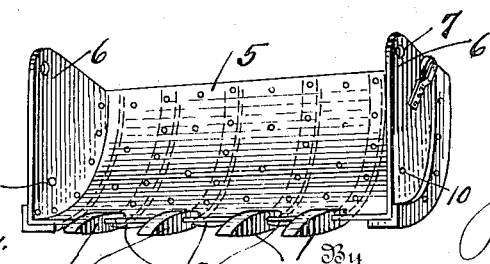

Figure 1 is a side elevation of a device constructed in accordance with my invention and showing the shovel in inoperative position; Fig. 2 is a longitudinal sectional view of the apparatus with the shovel drawn into excavating position; Fig. 3 is a top plan view of the invention; and Fig. 4 is a perspective view of the shovel member alone.

Referring to the drawings, the numeral 1 designates a receptacle which constitutes the body portion of my scoop, consisting of spaced side members to which is secured at their rear ends the end wall 2, said end wall extending down the scoop sides and similarly over the top of said sides a short distance. Intermediate the sides of the scoop is a brace bar 3 for holding the forward ends in proper spaced relation. It will be observed that the forward and lower edges of the sides aforesaid incline upwardly, as indicated at 4, and since the rear edges are curved it will be obvious that the receptacle is capable of being tilted longitudinally in a manner to be more clearly understood as this description proceeds. A shovel, most distinctly shown in Fig. 4, and designated 5, is provided with lateral arm plates 6 which are disposed exteriorly of the scoop and pivoted to the side members thereof at 7 adjacent the upper edge portion. The shovel is curved in a transverse direction, said curve conforming to the curvature of the rear edges of the sides of the scoop or receptacle, and this member is also provided with a plurality of spaced teeth 8 secured to its forward cutting edge and extending along its under surface. These teeth are of sufficiently heavy material to withstand considerable wear and the lower under surface of the shovel is in addition provided with wearing plates intermediate the teeth, as indicated by 9.

To the lower forward edge of each side plate 6 of the shovel 5 is pivotally secured, as at 10, a draw bar 11, said bars extending forwardly of the receptacle and passing through the guide keepers 12 adjacent the front edges of the sides thereof. A spreader bar 13 is connected to the forward extremities of the draw bars and the head line 14 is suitably connected to these draw bars through the instrumentality of the coverging chains 15. Secured to the rear upper end portion of the scoop at each side thereof is a guide roller 16, while a similar roller is mounted on each of the side plates 6 of the shovel 5 as indicated at 17. A flexible lifting member such as a wire or similar cable 18 is attached at one end to the clip 19 secured to the draw bar 11 while at its other end said cable is attached to the tail line 20, the cable, however, passing over the upper guide roller 16 and around the lower guide roller 17. A second cable 21 is connected at its forward end to the rear extremity of the draw bar 11 and also to the rear or tail line 20. It will be understood, of course, that a pair of these cables 18 and 21 are employed one at each side of the apparatus and all connected to the common rear draft member 20 as above noted.

In the use of the invention it will be obvious that application of draft on the forward draft means through the draw bars 11 will move the shovel 5 into its lowermost or excavating position, as clearly shown in Fig. 2 of the drawing, and in such position will when dragged over the ground load the scoop with the excavated material, the shovel coöperating with the end wall 2 of the scoop to maintain the material in the receptacle. When the scoop has reached the point of dumping, application of stress to the tail line 20 will first actuate the shovel 5 through the instrumentality of the lifting cables 18 to raise said shovel, or more accurately speaking, cause the same to move through an arc until it assumes the inoperative position best shown in Fig. 1. The continuous draft of the member 20 taking effect through the cables 21 as soon as the slack has been taken out of said last mentioned cables, causes the scoop to tilt forwardly onto the inclined edges 4 of the receptacle sides. Thus the shovel is preliminarily moved out of the path of the discharging load which load is forcibly ejected from the scoop by the end wall 2 when the shovel passes upwardly and to the rear of said wall.

It will be obvious from the foregoing description that the subject-matter of this invention is capable of being used in various lines of excavating and a most desirable arrangement of the parts is provided which will enable the excavation of material and hauling of the same to the desired point of discharge where the removal of the contents is quickly and entirely performed through the application of stress in a rearward direction. The arrangement of the shovel also is such that in its inoperative position the teeth are withdrawn into a position where they will not tend to drag the material that has been dumped and will not be subjected to the stress and wear which is commonly the case with drag scrapers of this type. Furthermore, forward movement of the excavating member of this device is limited by means of the adjustable stops 22 detachably secured to the sides of the receptacle 1, said sides being provided with a plurality of openings 23 to enable varying adjustment of said stop members. The coöperation of the stop members 22 with the excavating member controls advantageously the depth of cutting action of the shovel and preferably these stop members are attached so that when the shovel is at its forward limit of movement the teeth will be practically drawn into the space between the sides of the receptacle and this prevents undue wear on the cutting members or teeth when the device is subject to long distance drags.

Having thus described the invention, what is claimed is:—

1. An excavating device of the class described comprising a receptacle, a movable shovel connected thereto, draft means connected to the shovel for moving the same in one direction for excavating action, and means for initially actuating the shovel in the opposite direction to remove the same out of the path of the discharging load and subsequently tilting the receptacle in the direction of movement of said receptacle by the draft means for the removal of the contents of said receptacle.

2. An excavating device of the class described comprising a receptacle, a movable shovel connected thereto, forward draft means connected to the shovel for drawing the shovel into excavating position, and rear draft means operatively connected to the shovel and adapted to counteract the forward draft whereby to initially raise the shovel out of the path of the discharging load and subsequently cause tilting of the receptacle to discharge its contents.

3. An excavating device of the class described comprising a receptacle, a movable shovel connected thereto, draft means connected to the shovel and receptacle for drawing the former into excavating position and moving the receptacles, means connected to the shovel for moving the same out of excavating position, and means separate from the shovel actuating means for tilting the receptacle and coacting with the means aforesaid but normally inactive until the shovel has been moved into the inoperative position aforesaid.

4. An excavating device of the class described comprising a receptacle, a movable shovel connected thereto, draft means connected to the shovel for drawing the same into excavating position and moving the receptacle, means connected to the shovel for moving the same out of excavating position, separate means for tilting the receptacle coacting with the means aforesaid, and draft means to which the means for moving the shovel out of excavating position and the receptacle tilting means are connected adapted to initially actuate the former and subsequently the latter.

5. An excavating device of the class described comprising a receptacle, a shovel pivotally connected thereto, forward draft means including a draw bar connected to the shovel, rear draft means, a lifting member connected at one end to the draw bar and at its other end to the rear draft means, a tilting member operatively connected at one end to the shovel and at its other end to the rear draft means, and means arranged laterally of the rear draft connection and coöperating with the lifting member rendering the latter operative prior to action of the tilting member whereby to cause actuation of the shovel upon application of stress to the rear draft means for removal of said shovel out of the path of the discharging load preliminary to the tilting of said receptacle.

6. An excavating device of the class described comprising a receptacle, a shovel pivotally connected thereto, forward draft means connected to the shovel for moving the same into forward excavating position, rear draft means connected to the forward draft means for tilting the receptacle, a flexible member connected at one end to the forward draft means and at its other end to the rear draft means for drawing the shovel into inoperative position, and guide members over which the flexible member passes whereby to impart lifting action to the shovel preliminary to tilting of the receptacle.

7. An excavating device of the class described comprising a scoop consisting of spaced sides, a shovel pivotally secured to the sides of the scoop, draw bars pivotally secured to the shovel, forward draft means connected to the draw bars, rear draft means operatively connected to the shovel, a lifting cable connected to the shovel and to the rear draft means for actuation thereby, and guide means over which the lifting cable passes to cause lifting of the shovel upon initial application of stress to the rear draft means.

8. An excavating device of the class described comprising a scoop consisting of spaced sides, a toothed shovel having side arms pivotally secured to the scoop, draw bars connected to the shovel at each side of the same, a head line connected to the draw bars, a tail line, cables connected to the shovel at one end and to the tail line at their other end, lifting cables for the shovel also connected to the tail line, and guide rollers located laterally of the point of connection of the lifting cables with the tail line and over which the lifting cables pass.

9. An excavating device of the class described comprising a scoop consisting of spaced sides formed with an upwardly inclined lower edge, a rear end wall secured to the spaced sides and covering a portion of the rear end, a shovel having spaced side plates pivotally mounted on the spaced sides of the scoop, guide rollers secured to the scoop sides and other guide rollers secured to the shovel sides, lifting cables connected to the shovel and passing about the guide rollers aforesaid, rear draft means to which the lifting cables are attached, other cables operatively connected at one end to the shovel and at the other end to the rear draft means which are slack when the shovel is in excavating position, draw bars pivotally secured to the shovel side plates, and forward draft means connected to the draw bars aforesaid.

10. An excavating device of the class described, comprising a receptacle, an excavating member pivotally connected to the receptacle at its upper portion and adapted to swing beneath the receptacle for excavating operation, draft means connected to the excavating member for swinging the same on its pivot to the position above mentioned and for moving the receptacle during excavation, and stop means adjustably connected to the receptacle and arranged in the path of movement of the excavating member for limiting swinging movement thereof and thereby controlling the depth of cutting action of said excavating member.

In testimony whereof I affix my signature in presence of two witnesses.

CYRUS R. WEST.

Witnesses:
 ADOLPH BEHRENS,
 L. CHARSEN.